(12) United States Patent
Bragatto

(10) Patent No.: US 8,770,121 B2
(45) Date of Patent: Jul. 8, 2014

(54) SEED DISTRIBUTION ELEMENT FOR PRECISION SEED DRILLS, SEED DRILL INCLUDING SAID ELEMENT

(75) Inventor: Enrico Bragatto, Caorle (IT)

(73) Assignee: Maschio Gaspardo S.p.A., Campodarsego (PD) (IT)

( * ) Notice: Subject to any disclaimer, the term of this patent is extended or adjusted under 35 U.S.C. 154(b) by 0 days.

(21) Appl. No.: 13/521,896

(22) PCT Filed: Nov. 10, 2011

(86) PCT No.: PCT/EP2011/069875
§ 371 (c)(1),
(2), (4) Date: Oct. 8, 2012

(87) PCT Pub. No.: WO2012/062876
PCT Pub. Date: May 18, 2012

(65) Prior Publication Data
US 2013/0019788 A1  Jan. 24, 2013

(30) Foreign Application Priority Data

Nov. 12, 2010 (IT) .............................. PD2010A0338

(51) Int. Cl.
*A01C 7/04* (2006.01)
(52) U.S. Cl.
USPC ........................................................... 111/185
(58) Field of Classification Search
USPC ........................................ 111/170, 174–185
See application file for complete search history.

(56) References Cited

U.S. PATENT DOCUMENTS 7,228,807 B1   6/2007  Ven Huizen

FOREIGN PATENT DOCUMENTS

EP          0536543 A1     4/1993

OTHER PUBLICATIONS

International Search Report and Written Opinion in parent application PCT/EP2011/069875.

*Primary Examiner* — Christopher J Novosad
(74) *Attorney, Agent, or Firm* — Kristina Castellano; Castellano PLLC

(57) ABSTRACT

A seed distribution element (1) includes: —a sowing disc (16) rotated by a motor-driven transmission shaft (20) —a housing (10) with a fixed portion (11) in which the shaft (20) is supported and a portion (12) movable relative to the fixed portion and can be closed against it, with a seed collection chamber (15) in the fixed portion (11) and a pneumatic suction chamber (17) in the movable portion (12), —the sowing disc (16) being interposed between the portions (11, 12) and having opposed surfaces (16a, 16b) delimiting the chambers, and provided with a ring of selector holes (23) extending between the opposed surfaces structure for producing a pressure differential between the opposed surfaces in the region of a circumferential segment of the ring of holes, including the pneumatic suction chamber, and —a seal (24) on the movable portion (12) capable of sliding contact with the facing surface (16a) of the disc (16) when the portions are closed against one another,—a thrust-bearing element (26) of the sowing disc (16), supported rotatably in the movable portion (12), to withstand the axial load produced by the disc (16) on the seal (24).

16 Claims, 2 Drawing Sheets

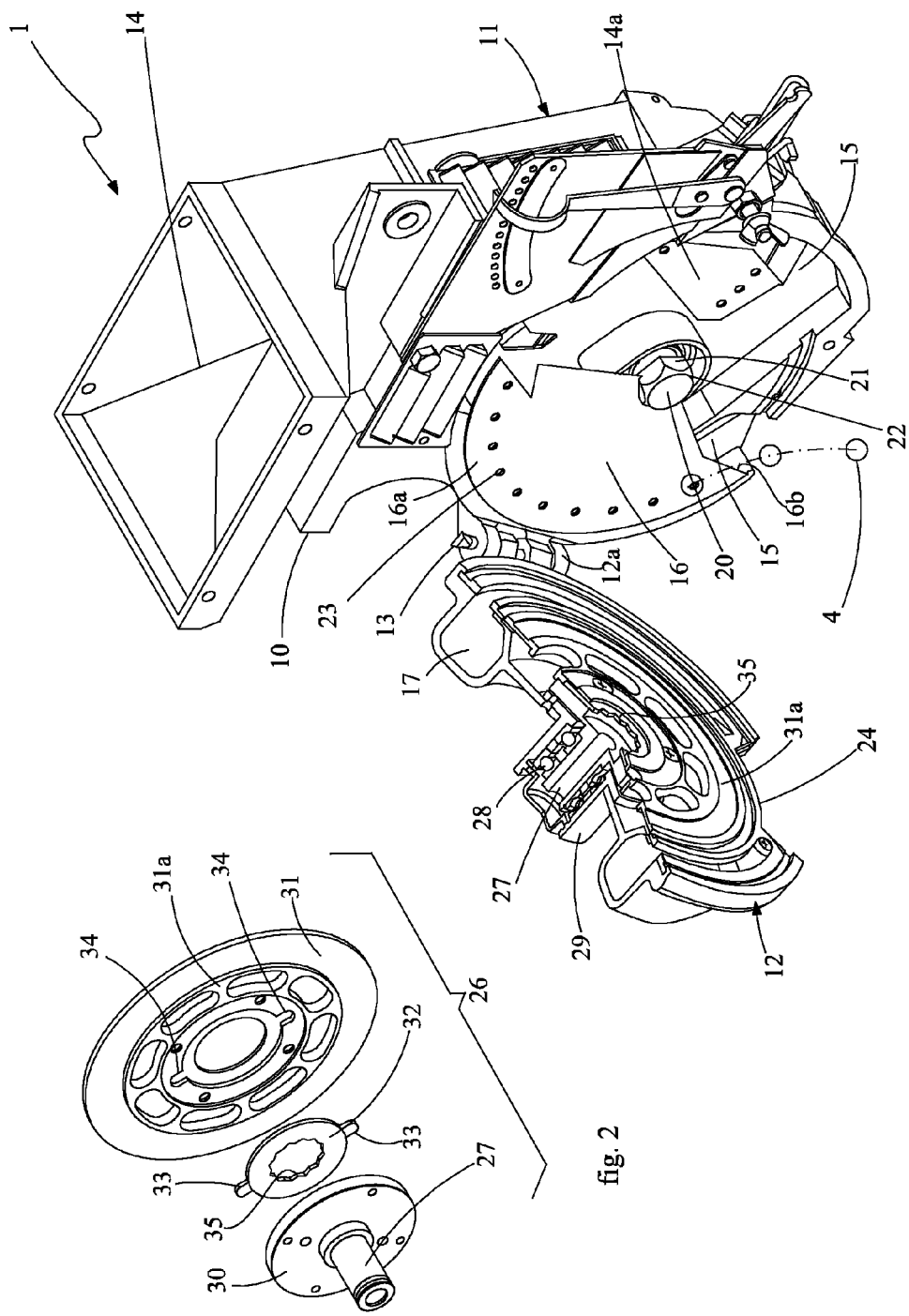

SEED DISTRIBUTION ELEMENT FOR PRECISION SEED DRILLS, SEED DRILL INCLUDING SAID ELEMENT

CLAIM FOR PRIORITY

This application is a U.S. National Stage Application of PCT/EP2011/069875 filed on Nov. 10, 2011, claiming priority to Italian application PD2010A000338 filed Nov. 12, 2010, the contents of both of which are incorporated herein by reference.

DESCRIPTION

The subject of the present invention is a seed distribution element for precision pneumatic seed drills, a sowing element for such machines and a seed drill including a plurality of such sowing elements.

In precision pneumatic seed drills it is known to use sowing elements which are each equipped with a seed distribution element (hereinafter, in brief, distributor) for distributing one seed at a time in a controlled delivery while the sowing element moves along a sowing track.

It is equally known to use seed distributors which use an air pressure differential between opposed faces of a sowing disc (or selector) provided with one or more rings of through holes. The operating principle is based on the fact that, as a result of the pressure differential between the opposed faces of the disc, a seed adheres to each hole and is then transported by the rotation of the sowing disc from the seed selection zone to the point at which the pressure differential ceases and the seed is released to drop through a sowing pipe into the furrow or sowing track. In practice, on one of the faces of the disc a strong air suction is exerted which retains the seeds on the opposite face in the region of the respective holes. An example of such devices is disclosed in U.S. Pat. No. 7,228,807.

For the correct functioning of such distributors it is necessary to ensure an effective pneumatic seal between the face of the disc that is subjected to suction and a seal which delimits the pneumatic suction chamber. The suction effect itself effects a substantial compression of the disc against the seal. If on the one hand this ensures adequate adherence of the seal to the disc surface which is subjected to negative pressure, on the other hand it involves severe abrasion of the seal which limits the effective service life thereof. It is therefore necessary periodically to replace the seal in order to prevent sowing errors arising from insufficient depressurization of the suction chamber.

On the other hand, even if replacing the seal is a simple operation, in each case it entails an unwanted machine stoppage, besides the cost of the spare part itself.

In order to remedy this drawback, seed drills have been developed which are equipped with a thrust-bearing element which relieves the heavy load on the seal. In all cases, however, the thrust-bearing element, which must be rotated with the disc, is mounted on the fixed portion of the housing, that is to say, that portion which is fixed to the framework of the sowing elements. This means that the disc must be attached to the thrust-bearing element; therefore an attachment system must be provided which in the stage of replacement of the disc must be removed, consequently lengthening the operation. This is inevitable in the known machines since it is obligatory to mount on the fixed portion the transmission which drives in rotation the motor-driven shaft which rotates the disc.

However, positioning the thrust-bearing element on the fixed portion entails the pneumatic suction chamber being provided on the fixed portion, or on the same side at which the thrust-bearing element is placed, while the seed collection chamber must be provided in the movable portion. This is the source of numerous drawbacks, including the fact that the opening of the housing necessarily involves the removal of the portion containing the seed collection chamber from the hopper type store located above, which must necessarily be fixed to the framework of the sowing element.

Furthermore, for the replacement of the sowing disc it is necessary to remove some parts of the distributor, such as the adjustable seed selector, and the seed ejector, where provided.

The problem underlying the present invention is that of providing a seed distribution element structurally and functionally designed to make it possible to remedy all the drawbacks mentioned with reference to the prior art cited.

This problem is solved by the invention by means of a seed distribution element produced in accordance with one or more of the attached claims.

The features and advantages of the invention will become clearer from the following detailed description of a preferred exemplary embodiment thereof, illustrated by way of non-limiting example with reference to the appended drawings, in which:

FIG. 1 is a perspective view of a seed distribution element produced according to the present invention;

FIG. 2 is an exploded perspective view of a detail of the element of FIG. 1;

Figure 3:
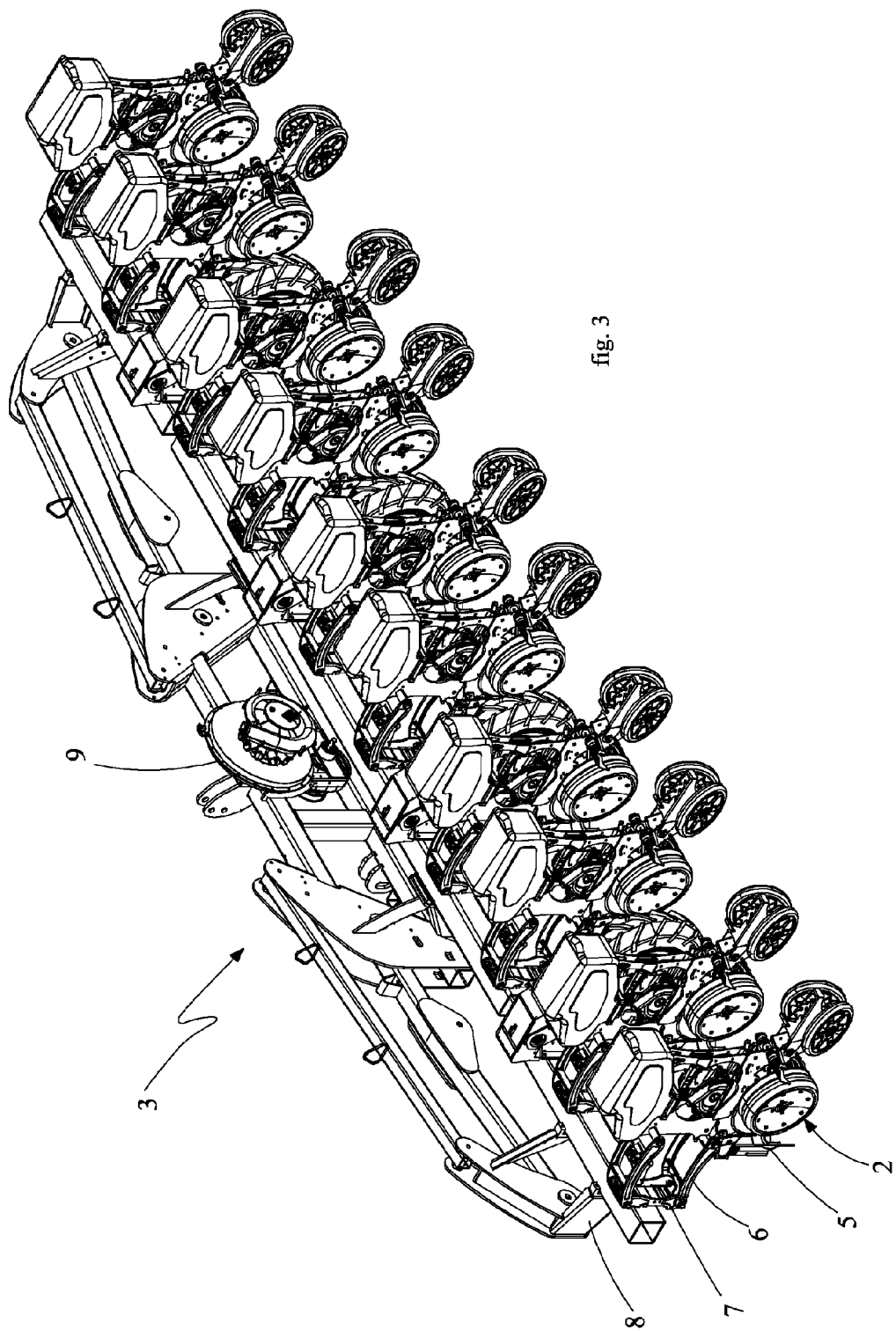
FIG. 3 is a perspective view of a seed drill equipped with sowing elements with a seed distribution element according to the invention.

In the drawings the reference 1 indicates as a whole a seed distribution element intended for equipping a sowing element 2 of a precision pneumatic seed drill 3.

The distribution element 1 is the device intended to deposit one seed 4 at a time at a predetermined adjustable spacing in a sowing furrow opened by a coulter 5. The sowing element 2, besides the distribution element 1, comprises a frame 6 and a seed store or hopper 7, besides other devices which are known per se and not necessary for the understanding of the present invention. The seed drill 3 itself comprises a bearing structure 8 on which a plurality of sowing elements 2 are mounted, all connected to a pneumatic suction device 9.

The sowing element 1 itself comprises a housing 10 with a fixed portion 11 fixed in a stable manner on the frame 6 and a movable portion 12 hinged in the region of a hinge 12a on the fixed portion 11 by means of a removable hinge pin 13. The fixed portion includes a throat 14 by means of which it is connected below an outflow mouth of the store or hopper 7 in such a way as to be fed directly by the latter.

From the throat 14 the seed flows through a gate 14a through which the seed flows into a seed collection chamber 15.

A sowing disc 16 separates the seed collection chamber 15 from a suction chamber 17 provided in the movable portion 12. A suction device 18 mounted on the bearing structure 8 is connected to the suction chamber 17 by means of pipes 19 for producing a pressure differential between the opposed surfaces 16a, 16b of the selector disc 16.

The sowing disc 16 is removably mounted on a motor-driven drive shaft 20, supported in the fixed portion 11 and driven in rotation at predetermined adjustable speeds by a transmission which is not shown.

The presence of the transmission requires the shaft 20 to be mounted on the fixed portion 11 of the housing 10. The keying between the shaft 20 and the disc 16 is obtained by means of a polygonal profile 21 at the free end of the shaft 20 which protrudes beyond the disc 16 and preferably has chamfers 22 which serve to facilitate the functions explained hereinafter.

At the periphery of the disc 16 is/are provided one (or several) ring(s) of holes 23 passing between the opposed faces of the sowing disc 16.

A seal 24 is fitted in the suction chamber 17 and is placed in sliding contact with the facing surface of the disc 16, when the movable portion 11 is closed on the fixed portion 12, to delimit a circumferential segment in which the holes 23 are subjected to the aforesaid pressure differential.

The circumferential segment extends between the seed collection chamber 15 and a seed fall pipe 25 in which the seeds are released one at a time into the furrow formed by the coulter 5.

By reason of the pressure differential between the two opposed surfaces of the sowing disc, the seeds 4 are held, one to each hole 23, when the holes pass in the seed collection chamber 15, and are released in the region of the pipe 25 when the pneumatic effect of the pressure differential ceases or owing to the presence of a seed ejector (not shown).

In order to limit the wear on the seal 24 resulting from sliding against the surface of the disc 16, a thrust-bearing element indicated as a whole by 26 is mounted on the movable portion.

The thrust-bearing element 26 comprises a shaft 27 rotatably mounted by means of bearings 28 in a seat 29 of the movable portion 12. The shaft 27 has flanging 30 by means of which it is fixed to a thrust-bearing plate 31 which can bear on that surface of the disc which faces the seal 24 in a zone radially inside the ring of holes 23 in order to withstand at least some of the axial load produced by the disc 16 on the seal 24.

The bearing between the thrust-bearing plate 31 and the disc 16 takes place in the region of a ring 31a in relief on the surface of the plate which faces the disc 16.

The thrust-bearing element 26 is driven in rotation with the sowing disc 16 when the fixed and movable portions 11, 12 are closed against one another by means of a drive element 32 which comprises a coupling device constrained for rotation with the thrust-bearing plate but with radial and/or circumferential clearance in such a way as to be self-centred in the rotational coupling with the drive shaft of the disc 16. For this purpose, in the present form of embodiment, the drive element 32 is coupled with limited radial and/or circumferential clearance to the element 26 by means of one (or more) appendage(s) 33 protruding radially towards the outside and fitted into corresponding seats 34 of the plate.

The drive element 32 is coupled by means of an internal polygonal profile 35 (similar to that adopted for box-end wrenches) to the polygonal profile 21 of the free end of the shaft 20, the chamfers 22 of which serve to facilitate the centring of the two profiles and the respective engagement.

The drive element 32 is thus self-centring relative to the drive shaft 20 by which it is driven. The positioning between seal 24 and plate 31 is such that the rotation of the latter will not be hindered by the presence of the seal 24 and, at the same time, both will be kept bearing against the disc 16.

Provision is also made for the thrust-bearing element 26 to be made idle and not driven in rotation by the shaft 20.

The whole of the movable portion 12 complete with thrust-bearing element 26 and seal 24 lends itself advantageously to the production of a kit for the retrofitting of existing seed drills. It is sufficient in this case to separate the old type of movable portion by removing the hinge pin 13 and replacing the old movable portion with the aforesaid kit. By reconnecting the pneumatic pipes previously disconnected, the seed drill becomes ready for use.

Among the principal advantages of the distribution element according to the invention is the fact that the wear on the seal resulting from the sliding contact with the seed selector disc is substantially reduced, if not eliminated; the thrust-bearing element is self-centring, thereby allowing easy opening and closing of the movable portion on the fixed portion of the housing; the system additionally lends itself to easy retrofitting, all without removing movable parts and/or operations of disconnecting the sowing disc.

The invention claimed is:

1. A seed distribution element for precision pneumatic seed drills, comprising:
    a sowing disc which is rotated by a motor-driven transmission drive shaft at controlled speed,
    a housing with a fixed portion and a portion which is movable relative to the fixed portion and can be closed against the fixed portion,
    a seed collection chamber being defined in the fixed portion,
    a pneumatic suction chamber being defined in the movable portion,
    the sowing disc being interposed between the fixed and movable portions and having opposed surfaces delimiting the chambers,
    the sowing disc having at least one ring of selector holes extending between the opposed surfaces, and
    a seal which is arranged on the movable portion and is capable of sliding contact with the facing surface of the disc when the fixed and movable portions are closed against one another,
        wherein a pressure differential is provided between the opposed surfaces in the region of a circumferential segment of the ring of holes,
        wherein the seed distribution element further comprises a thrust-bearing element of the sowing disc, which thrust-bearing element is supported rotatably in the movable portion in order to withstand at least some of the axial load produced by the disc on the seal.

2. The seed distribution element according to claim 1, wherein the thrust-bearing element is rotated with the disc when the fixed and movable portions are closed against one another.

3. The seed distribution element according to claim 1, wherein the thrust-bearing element comprises a thrust-bearing plate which can bear on that surface of the sowing disc which faces the seal, in a zone radially inside of the ring of holes.

4. The seed distribution element according to claim 3, wherein the thrust-bearing element comprises a drive element which is fixed for rotation with the plate and can be coupled with the drive shaft of the disc when the fixed and movable portions are closed against one another.

5. The seed distribution element according to claim 4, wherein the drive element is self-centring relative to the drive shaft.

6. The seed distribution element according to claim 4, wherein the drive element comprises a coupling member which rotates jointly with the thrust-bearing plate but has radial and/or circumferential clearance so as to be self-centred during rotational coupling with the drive shaft of the disc.

7. The seed distribution element according to claim 1, wherein the movable portion is hinged to the fixed portion.

8. A sowing element for precision seed drills comprising a frame on which a seed distribution element according to claim 1 is mounted.

9. A seed drill comprising a supporting structure on which a plurality of sowing elements according to claim 8 are mounted.

10. A kit for the retrofitting of seed distribution elements of precision pneumatic seed drills wherein the distribution elements are of the type including:
- a sowing disc which is rotated by a motor-driven transmission drive shaft at controlled speed,
- a housing with a fixed portion and a portion which is movable relative to the fixed portion and can be closed against the fixed portion,
- a seed collection chamber being defined in the fixed portion,
- a pneumatic suction chamber being defined in the movable portion,
- the sowing disc being interposed between the fixed and movable portions and having opposed surfaces delimiting the chambers,
- the sowing disc having at least one ring of selector holes extending between the opposed surfaces, and
- a seal which is arranged on the movable portion and is capable of sliding contact with the facing surface of the disc when the portions are closed against one another,
  - wherein a pressure differential is provided between the opposed surfaces in the region of a circumferential segment of the ring of holes,
  - wherein the kit comprises:
- the movable portion pre-assembled with: a thrust-bearing element of the sowing disc, which thrust-bearing element is supported rotatably in the movable portion in order to withstand at least some of the axial load produced by the disc on the seal.

11. The kit according to claim 10 wherein the movable portion and the thrust-bearing element comprise at least one feature according to claim 2.

12. The kit according to claim 10 wherein the movable portion and the thrust-bearing element comprise at least one feature according to claim 3.

13. The kit according to claim 10 wherein the movable portion and the thrust-bearing element comprise at least one feature according to claim 4.

14. The kit according to claim 10 wherein the movable portion and the thrust-bearing element comprise at least one feature according to claim 5.

15. The kit according to claim 10 wherein the movable portion and the thrust-bearing element comprise at least one feature according to claim 6.

16. The kit according to claim 10 wherein the movable portion and the thrust-bearing element comprise at least one feature according to claim 7.

* * * * *